United States Patent [19]

Tranovich et al.

[11] Patent Number: 4,731,919

[45] Date of Patent: Mar. 22, 1988

[54] CENTERING MECHANISM FOR MOVING COIL FORCE MOTOR

[75] Inventors: Stephen J. Tranovich, Saugus; James L. Coakley, Fillmore, both of Calif.

[73] Assignee: HR Textron, Inc., Valencia, Calif.

[21] Appl. No.: 924,236

[22] Filed: Oct. 28, 1986

[51] Int. Cl.$^4$ ...................... H02K 15/00; H02K 15/14
[52] U.S. Cl. .................................................... 29/596
[58] Field of Search .................... 29/596, 597, 598; 310/15, 24, 26, 27, 154

[56] References Cited

U.S. PATENT DOCUMENTS

| | | | |
|---|---|---|---|
| 3,440,459 | 4/1969 | Pitt et al. | 310/15 |
| 3,610,973 | 1/1970 | Bauer | 310/15 |
| 4,433,279 | 2/1984 | Bhate | 310/15 |

Primary Examiner—Timothy V. Eley
Attorney, Agent, or Firm—Nilsson, Robbins, Dalgarn, Berliner, Carson & Wurst

[57] ABSTRACT

A method of manufacturing a moving coil force motor particularly adapted for utilization with a hydraulic servovalve. The method includes aligning a flexure spring with respect to the permanent magnet structure and thereafter securing the permanent magnet structure and flexure spring within a case for the force motor. Subsequently, the coil structure is aligned with respect to the gap provided in the permanent magnet pole pieces by relatively moving the motorcase with respect to the coil until the appropriate position is attained and thereafter securing the case against further movements.

4 Claims, 5 Drawing Figures

CENTERING MECHANISM FOR MOVING COIL FORCE MOTOR

FIELD OF THE INVENTION

This invention relates to moving coil force motors and more particularly to a method of manufacturing such motors wherein the moving coil is precisely and easily centered and maintained within the air gap provided between the permanent magnet pole pieces.

BACKGROUND OF THE INVENTION

Moving coil devices including electric motors of the moving coil type have been used in many different applications such for example as transducers, vibration detectors, loudspeakers, electromechanical relays, recording oscilliographs and as driving motors for servovalves. In each instance proper operation of the moving coil motor requires precise centering of the coil in the air gap between the pole pieces of the fixed magnetic circuit. This becomes particularly important in those instances where a greater force must be generated by the force motor such for example as in a hydraulic servovalve application. In the prior art, such precise centering has been accomplished by holding very tight manufacturing tolerances on the various assemblies locating the coil with respect to the gap. Such manufacturing techniques add significant expense to the cost of the force motor. The best prior art known to applicants are the structures disclosed in U.S. Pat. Nos. 3,067,404; 3,139,545; 3,440,459; 3,516,441 and 3,610,973.

SUMMARY OF THE INVENTION

A method of manufacturing a moving coil force motor which includes an air gap defined by permanent magnet pole pieces and a movable coil mounted on a flexure spring and positioned within the gap including the steps of aligning the flexure spring centrally of the permanent magnet pole pieces and thereafter rigidly securing the aligned members within a motor case. The movable coil is then affixed to a drive member and positioned centrally of the aligned spring, after which the case is relatively moved until the movable coil is disposed at a predetermined position within the air gap and thereafter the case is secured against further movement.

DETAILED DESCRIPTION

Figure 1:
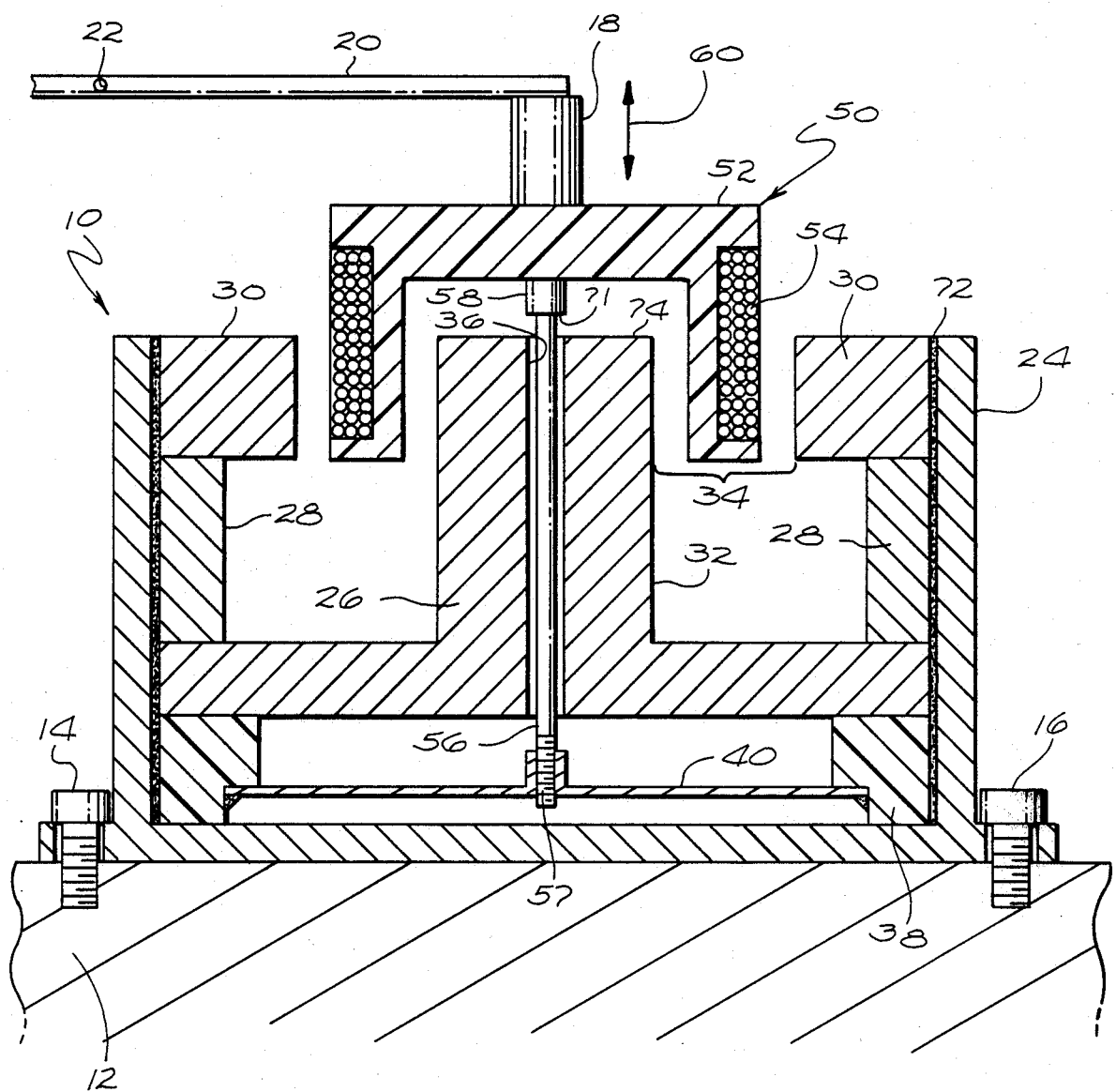
FIG. 1 is a cross-sectional schematic diagram illustrative of a moving coil force motor constructed in accordance with the method of the present invention.

By reference to FIG. 1, there is illustrated schematically a moving coil force motor manufactured by following the method of the present invention. For utilization of the method of the present invention the moving coil is precisely centered within the gap provided by the magnetic pole structures only through utilization and manipulation of components of the motor itself with removable tools, thereby substantially reducing the cost of manufacture of the force motor. As is shown in FIG. 1, the force motor 10 is mounted upon a base 12 and is held in place by appropriate fastening devices such as mounting screws 14 and 16. The force motor is attached by means of an attaching mechanism 18 to a force transmitting member such for example as a movable arm 20 which may be pivoted about a pivot point 22. The movable arm 20, for example, may be affixed to a hydraulic servovalve (not shown) to control the flow of hydraulic fluid under pressure to an appropriate load, as is well known in the art.

The force motor 10 includes a case 24 within which there is disposed a magnetic pole structure 26 including a permanent magnet 28 with appropriate magnetic material 30, 32 affixed thereto to define a working air gap 34. Preferably the magnetic pole structure is circular in configuration and defines a central aperature 36 therethrough.

Figure 2:
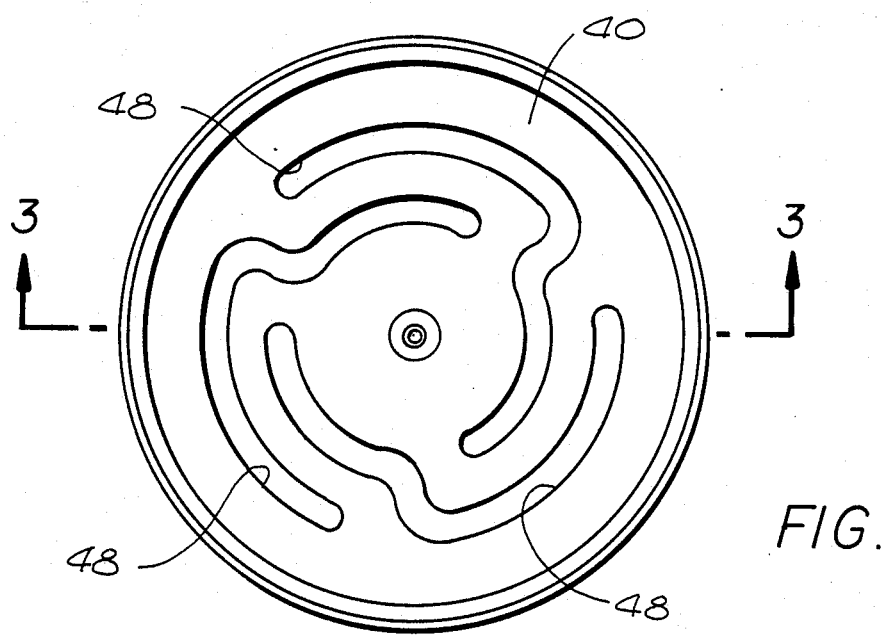
FIG. 2 is a plan view of a flexure spring assembly thereof.
Figure 3:
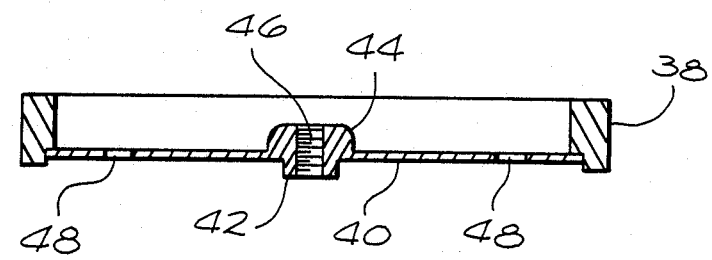
FIG. 3 is a cross-sectional view of the flexure spring assembly taken about the lines 3—3 of FIG. 2.

A flexure spring assembly (not shown), including a spring retainer 38 and a flexure spring 40, is provided. The flexure spring 40 includes a central hub 42 having a body 44 extending therefrom and defining an internally threaded opening 46 therethrough (FIG. 3). As is more clearly seen in FIG. 2 the flexure spring 40 defines a plurality of openings 48 therethrough enabling the spring to appropriately flex in a direction transverse thereto. The flexure spring 40 is secured to the retainer 38 and the hub 42 by electron beam welding or the like. Alternatively, the hub 42 with the body 44 may be formed with the spring 40 as a single member having a centrally threaded opening as shown in FIG. 1.

The moving coil structure 50 includes a bobbin 52 upon which there is wound a coil 54 to which is applied control signals from a source thereof (not shown). The coil structure 50 is secured to the flexure spring 40 by means of a driven member such as a guide rod 56 which is threadably received within the aperture 46 defined by the body 44. The guide rod 56 is attached at its opposite end to the bobbin 52 and defines an enlarged diameter area 58 which has an outer diameter which substantially matches the diameter of the opening 36 through the magnetic pole structure.

As will be noted by those skilled in the art, the coil structure 50 is precisely positioned (in the absence of signals) exactly within the center of the working air gap 34. Thus as signals are applied to the coil 54 the coil structure 50 is caused to move as indicated by the arrow 60 to in turn move the arm 20 and the apparatus connected thereto.

Figure 4:
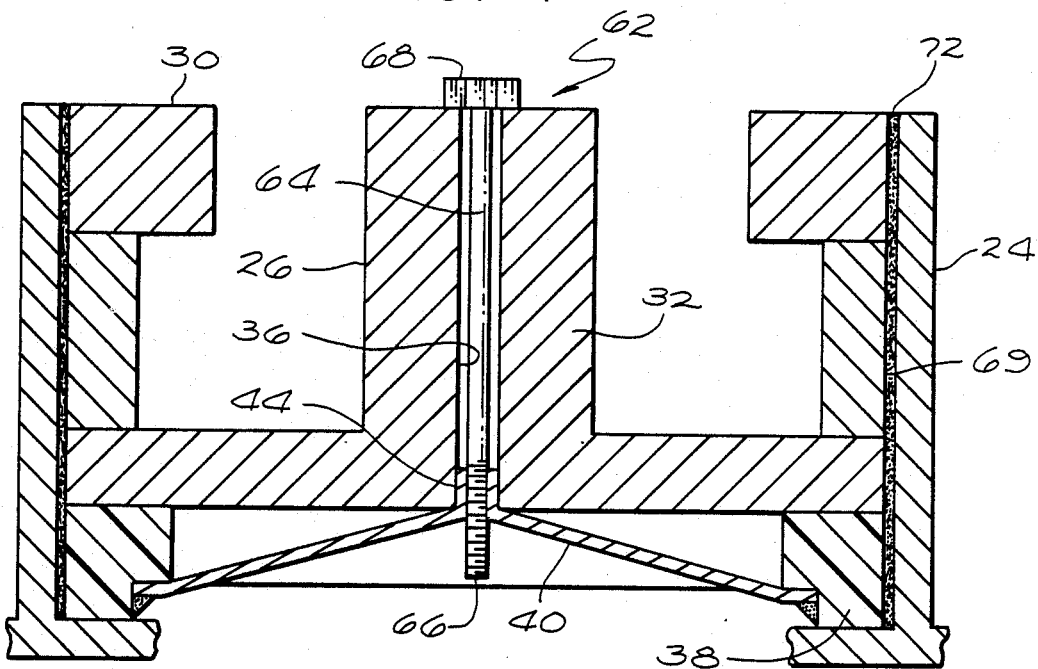
FIGS. 4 and 5 are fragmentary views illustrating steps in the method of manufacturing of the force motor illustrated in FIG. 1.
Figure 5:
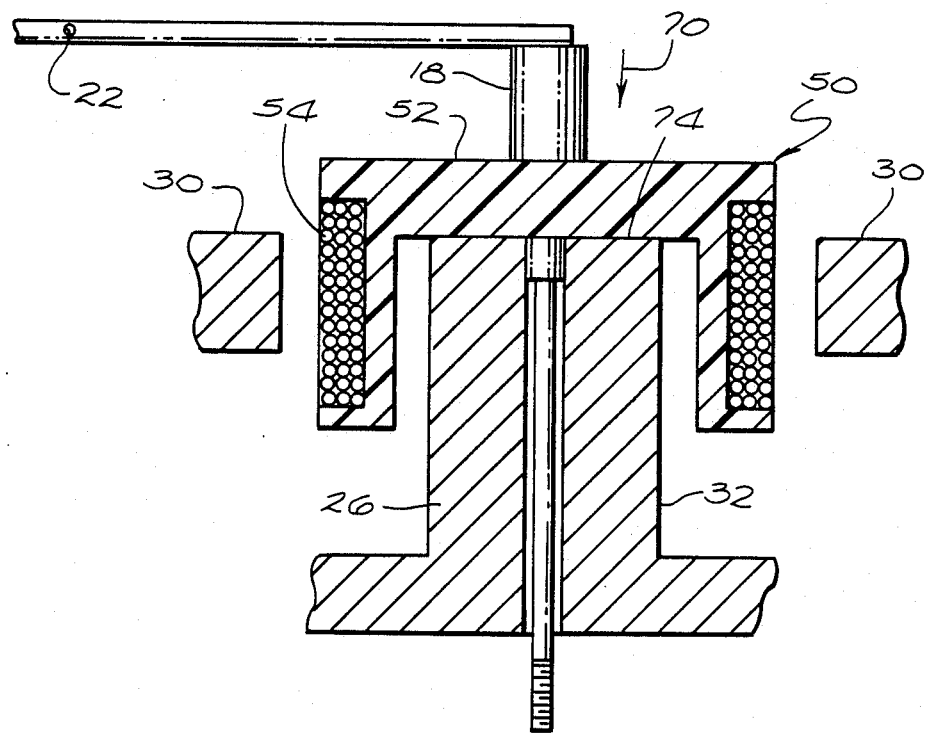

In the method of manufacturing the force motor as shown in FIG. 1 and described above, reference is now made more specifically to FIGS. 4 and 5. It becomes necessary to align the flexure spring assembly so that it is centrally positioned with respect to the permanent magnet pole pieces. This is accomplished by the utilization of a tool shown generally at 62 which includes a rod 64 having a threaded end 66 and a head 68. The rod 64 is inserted through the opening 36 provided in the magnetic pole structure 26 with the threads 66 threadably engaging the threads appearing in the opening 46 of the body 44. The tool is manipulated such that the body 44 is received within the opening 36 and is tightened until it is fully received therein thus centrally positioning the flexure spring assembly with the spring retainer 38 snugly positioned against the magnetic pole structure 26. It will be recognized that the outer diameter of the body 44 is substantially equal to the diameter of the aperture 36 in the magnetic pole structure 26, thereby accurately positioning the flexure spring centrally of the permanent magnet pole structure. Subsequent to centrally aligning the flexure spring assembly with the permanent magnet pole structure the outer surface 70 of the thus aligned subassembly is coated with an adhesive such as epoxy and it is then placed within the interior of the case 24 as shown in FIG. 1 with the epoxy being illustrated at 72 thereof. Upon curing of the epoxy the tool 62 is removed from the sub-assembly and thereafter the precise positioning of the hub 44 centrally of the magnetic pole structure is maintained by the flexure spring 40.

The coil structure 50 with the guide rod 56 attached thereto is then secured to the flexure spring hub by means of threading the end 57 of the guide rod into the threads defined within the aperture 46 of the hub 42 thereby completing the assemblage of the motor 10. The completed motor is then placed upon the base 12 and is attached to the member 20 by means of the attaching mechanism 18. The mounting screws 14, 16 and additional ones should they be provided, are then loosely threaded into the mounting base 12. It will be noted that the openings in the motor case through which the mounting screws are inserted are provided with sufficient clearance to enable some movement of the motor case relative to the base 12. At this point light pressure is applied to the coil structure 50 as is shown by the arrow 70 to cause the lower surface 71 of the enlarged diameter section 58 of the guide rod 56 to rest upon the surface 74 of the magnetic pole structure. While the very light pressure just causing the engagement of the surfaces 71 and 74 to occur is maintained the motor case with the magnetic pole structure affixed internally thereof is moved within the confines permitted by the clearance of the openings receiving the mounting screws. As the motor case is moved the enlarged diameter area 58 will fall into the aperture 36 provided in the magnetic pole structure 26. When such occurs the coil structure 50 is aligned with the working gap provided by the magnetic pole structure and is positioned precisely centrally within the working gap 34, all as illustrated in FIG. 5. While retaining the light pressure 70 so that the locating enlargement or shoulder 58 is retained within the opening 36, the mounting screws 14, 16 are then securely tightened to maintain the position of the case. Thereafter the pressure 70 can be removed and the flexure spring will return the coil structure 50 to the position as illustrated in FIG. 1.

It should be recognized by those skilled in the art that through the positioning of the flexure spring centrally of the magnetic pole structure and by thereafter positioning the coil structure centrally of the magnetic pole structure, after attaching the same to the flexure spring, the coil structure is precisely positioned centrally of the working gap thus providing the most efficient operation of the moving coil force motor particularly as applied to control of a hydraulic servovalve. Such structure also provides the maximum clearance possible between the moving coil and the fixed pole pieces. This becomes important in those applications where the coil is moving through an arc, as is shown in FIG. 1, since the arm 20 is fixed at the pivot point 22.

What is claimed is:

1. A method of manufacturing a moving coil force motor having fixed permanent magnet pole pieces defining an air gap therebetween disposed within a motorcase and a movable coil mounted on a flexure spring member to precisely position the coil within the gap comprising the steps of:
    aligning said flexure spring member centrally of said permanent magnet pole pieces;
    rigidly securing said aligned spring and permanent magnet pole pieces within said motorcase;
    affixing said movable coil to a driven member and centrally of said aligned spring;
    relatively moving said motorcase with respect to said movable coil until movable coil is centered within said air gap; and
    securing said motorcase against further movement.

2. A method of manufacturing as defined in claim 1, wherein said permanent magnet pole pieces define a central aperture therethrough and said spring and said coil are aligned relative to said central aperture.

3. A method of manufacturing as defined in claim 2, wherein said flexure spring member includes a central hub having a body extending therefrom and said alignment of said spring includes retaining said body within said central aperture while said spring and pole pieces are rigidly secured within said motorcase.

4. A method of manufacturing as defined in claim 3, wherein said flexure spring member further includes spring retention means affixed to and extending about the periphery thereof and said body is retained within said central aperture by a threaded rod extending through said aperture and threadably engaging said hub to pull said body into said aperture and said retention means against said pole pieces.

* * * * *